US012313752B2

(12) United States Patent
Clare et al.

(10) Patent No.: US 12,313,752 B2
(45) Date of Patent: May 27, 2025

(54) MITIGATING ERRORS IN GNSS WITH UPWARD FACING SENSOR

(71) Applicant: Trimble Inc., Westminster, CO (US)

(72) Inventors: Adam Clare, Westminster, CO (US); Shawn Weisenburger, Westminster, CO (US); Yu Jiao, Westminster, CO (US)

(73) Assignee: Trimble Inc., Westminster, CO (US)

(*) Notice: Subject to any disclaimer, the term of this patent is extended or adjusted under 35 U.S.C. 154(b) by 441 days.

(21) Appl. No.: 17/993,487

(22) Filed: Nov. 23, 2022

(65) Prior Publication Data
US 2024/0168175 A1 May 23, 2024

(51) Int. Cl.
G01S 19/47 (2010.01)
G01S 19/07 (2010.01)

(52) U.S. Cl.
CPC .............. G01S 19/47 (2013.01); G01S 19/07 (2013.01)

(58) Field of Classification Search
CPC .......... G01S 19/47; G01S 19/07; G01S 19/22; G01S 19/28
USPC ...................................................... 455/552.1
See application file for complete search history.

(56) References Cited

U.S. PATENT DOCUMENTS

| | | | | |
|---|---|---|---|---|
| 5,446,465 A * | 8/1995 | Diefes | ........................ | G01S 3/48 342/357.34 |
| 6,157,621 A * | 12/2000 | Brown | .................. | H01Q 25/008 370/310 |
| 6,925,378 B2 * | 8/2005 | Tzamaloukas | ..... | G01C 21/3492 701/428 |
| 11,536,856 B2 * | 12/2022 | Niesen | ..................... | G01S 19/49 |
| 2006/0074558 A1 * | 4/2006 | Williamson | ............ | G01S 19/15 342/357.56 |
| 2008/0166011 A1 * | 7/2008 | Sever | ....................... | G01S 19/28 382/100 |
| 2012/0249369 A1 * | 10/2012 | Pon | .......................... | G01S 19/28 342/357.67 |
| 2014/0240170 A1 * | 8/2014 | Rudow | ................... | G01S 19/07 342/357.42 |

(Continued)

FOREIGN PATENT DOCUMENTS

| | | | | |
|---|---|---|---|---|
| CN | 105388495 A | * | 3/2016 | ........... A61B 5/1112 |
| EP | 3 940 427 A1 | | 1/2022 | |

(Continued)

OTHER PUBLICATIONS

Extended European Search Report for Application No. 23210626.0-1206, mailed Apr. 24, 2024, 9 pages.

(Continued)

Primary Examiner — Mahendra R Patel
(74) Attorney, Agent, or Firm — Kilpatrick Townsend & Stockton LLP

(57) ABSTRACT

Disclosed are a method and apparatus are provided for determining the amount of obstruction of a view of a satellite. An estimated satellite location from a satellite signal is mapped to a matrix of obstructions. A window is determined around the satellite location and all the obstructions within the window are considered in determining whether the satellite is obstructed, with the window considering the degree of possible error within the various measurements. In embodiments, the window size if varied based on the estimated amount of error and location of the satellite within the matrix.

20 Claims, 11 Drawing Sheets

(56) References Cited

U.S. PATENT DOCUMENTS

| | | | | |
|---|---|---|---|---|
| 2014/0324291 A1* | 10/2014 | Jones | ............ | G01S 19/44 |
| | | | | 701/41 |
| 2014/0378170 A1* | 12/2014 | Rudow | ............ | G01S 19/43 |
| | | | | 455/456.6 |
| 2015/0378024 A1 | 12/2015 | Skalicky et al. | | |
| 2016/0274242 A1 | 9/2016 | Skalicky et al. | | |
| 2016/0280401 A1* | 9/2016 | Driscoll | ............ | G01S 5/011 |
| 2016/0349379 A1 | 12/2016 | Lacaze et al. | | |
| 2017/0102467 A1* | 4/2017 | Nielsen | ............ | G01S 19/47 |
| 2017/0139052 A1* | 5/2017 | Skalicky | ............ | G01S 19/28 |
| 2018/0188381 A1* | 7/2018 | Zhang | ............ | H04W 4/021 |
| 2018/0188382 A1* | 7/2018 | Jose | ............ | G01S 19/27 |
| 2019/0056505 A1 | 2/2019 | Morley | | |
| 2023/0231699 A1* | 7/2023 | Richarte | ............ | H04L 63/0428 |
| | | | | 713/170 |

FOREIGN PATENT DOCUMENTS

| | | | | |
|---|---|---|---|---|
| WO | WO-0048017 A1 * | 8/2000 | ............ | G01S 19/05 |
| WO | WO-2006015339 A2 * | 2/2006 | ............ | G01S 19/09 |
| WO | WO-2006113689 A2 * | 10/2006 | ............ | G01S 19/28 |
| WO | WO-2015077514 A1 * | 5/2015 | ......... | G01C 21/1654 |

OTHER PUBLICATIONS

Bauer, S., et al., "Evaluation of Shadow Maps for Non-Line-of-Sight Detection in Urban GNSS Vehicle Localization with VANETs—The GAIN Approach," IEEE $63^{rd}$ Vehicular Technology Conference, Jun. 2, 2013, pp. 1-5.

Xu, H., et al., "Sky visibility estimation based on GNSS satellite visibility: an approach of GNSS-based context awareness," GPS Solutions, Springer Berlin Heidelberg, vol. 24, No. 2, Mar. 16, 2020, 15 pages.

* cited by examiner

FIG. 6

FIG. 8A  Actual Classification

FIG. 8B  Wrong Classification w/ 3° Heading Error

MITIGATING ERRORS IN GNSS WITH UPWARD FACING SENSOR

BACKGROUND OF THE INVENTION

The present invention relates generally to location determination using a global navigation satellite system (GNSS) and in particular to mitigating errors in satellite location.

Global navigation satellite systems (GNSS) include various constellations of satellites orbiting the earth. Examples include the Global Positioning System (GPS) (operated by the United States), GLONASS (operated by Russia), Galileo (operated by the European Space Agency), and BeiDou (operated by China). Each satellite emits signals that include satellite identifiers, ephemeris data (indicative of the location and health of the satellite), and timestamps. A GNSS receiver unit can receive signals from multiple satellites in one or more constellations and use the timestamps to determine the propagation delay time from the satellite to the receiver. Given signals from at least three or four satellites (depending on the particular receiver design), a location (typically expressed as a set of coordinates that can include a latitude, a longitude, and/or an altitude), can be triangulated. Signals from more than a minimum number of satellites can be used to improve accuracy of the location.

Location determination using GNSS is subject to various sources of error, including variable delays in the ionosphere and/or troposphere, clock synchronization errors, ephemeris errors, and multipath errors (where the signal may not take a direct path to the receiver). Accuracy of location determination using GNSS trilateration techniques is often limited to a few meters under open sky conditions and becomes worse under limited-view conditions.

One use of GNSS is for surveying. An upward looking camera with a fisheye (180 degree field of view) lens is attached to a GNSS receiver on a survey pole. The upward looking camera captures pictures of the environment. This information is used by the GNSS receiver to select, reject, or de-weight the satellites it is tracking and for which it has measurements. If a satellite is behind a building, for example, it is rejected. The GNSS receiver may also contain an Inertial Measurement Unit (IMU) with, for example, a gyroscope, to provide orientation of the platform (roll, pitch, and heading angles). The accuracy is limited due to a variety of limitations on precision of the various elements, including the camera sensor, a lens, the IMU and the GNSS. It is desirable to achieve more accuracy by accounting for the potential errors.

Unless otherwise indicated herein, the materials described in this section of the Specification are not prior art to the claims in this application and are not admitted to be prior art by inclusion in this section.

BRIEF SUMMARY OF THE INVENTION

In embodiments, a method and apparatus are provided for determining the amount of obstruction of a view of a satellite from a location determination device. A satellite signal is received, and a satellite location measurement is extracted from the received satellite signal. A sensor (e.g., camera) provides a signal within its field of view, and the obstructed areas are determined. An estimated location of the satellite is determined and a window of locations around the estimated location of the satellite is determined to account for errors in the measurement equipment. A likelihood of obstruction of the satellite signal is determined from the overlap of the obstructed areas and locations in the window, including locations other than the estimated location of the satellite. Based on the amount of obstruction in the window, a weight is assigned to the reliability of the satellite signal. Based on the weighted value, a determination is then made whether to use, reject or deweight the satellite signal to determine a location of the location determination device.

In certain embodiments, the sensor is an upward facing camera. The camera image is segmented into different classifications of obstructions based on the degree of obstructions. The segments are then transformed into a matrix of elevation v. azimuth. Alternately, the transformation is done before segmentation. The pixels are given an obstruction score from clear blue sky (e.g., 1) to completely obstructed, such as by a building (e.g., 4). The estimated satellite location (elevation and azimuth), as determined from the satellite signal, is then plotted onto a pixel of the matrix. Because of the various errors in elements of the system, either the satellite location or the obstruction location may be off by a margin of error. A window of pixels around the satellite location is sized to cover the margin of error and thus ensure that (1) the actual satellite location is somewhere in the window and (2) take into account that the actual amount of obstruction may be any value within the window. The distribution of obstruction scores within the window is then used to give an obstruction score to the satellite. The distribution can be a mean, gaussian filter, or other method.

In embodiments, the obstruction score is further weighted by a reliability score. The reliability score in one embodiment is the standard deviation of all the obstruction scores within the window. Alternately, a standard mean or other method of measuring reliability could be used. In addition, a separate reliability can be assigned to particular classifications of obstructions within the window. For example, trees or foliage may have a lower reliability of the obstruction than buildings, since there can be a large variance between different trees or foliage, or because a classification method indicating light or dense foliage may not be completely reliable.

In embodiments, a machine learning or artificial intelligence module (e.g., neural network) is trained to determine the obstructions score to assign to different objects in the image. For example, buildings may be assigned a 4 as fully obstructed, dense foliage or trees may be assigned a 3, and light foliage or chain-linked fences may be assigned a 2, with open sky being assigned a 1. A reliability score may also be provided depending on how accurate the machine learning module proves to be. The reliability score can also be affected by the amount of training of the module.

Advantages of embodiments herein include providing a more accurate location signal in view of the inherent degree of precision of the various components of a location determining system.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

FIG. 6 is a diagram illustrating a subset of the segmentation matrix of FIG. 5 illustrating how it is represented in memory, according to embodiments.

DETAILED DESCRIPTION OF THE INVENTION

The following description of exemplary embodiments of the invention is presented for the purpose of illustration and description. It is not intended to be exhaustive or to limit the claimed invention to the precise form described, and persons skilled in the art will appreciate that many modifications and variations are possible. The embodiments have been chosen and described in order to best explain the principles of the invention and its practical applications to thereby enable others skilled in the art to best make and use the invention in various embodiments and with various modifications as are suited to the particular use contemplated.

Disclosed are techniques for improving the determination of which satellite signals to use depending upon whether the satellite view is obstructed by a building, tree, mountain, or other obstacle. The present invention addresses likely errors in determining the satellite position by using a window around the determined satellite position, and taking into consideration any obstructions, or lack thereof, within that window.

Figures 4A, 4B:
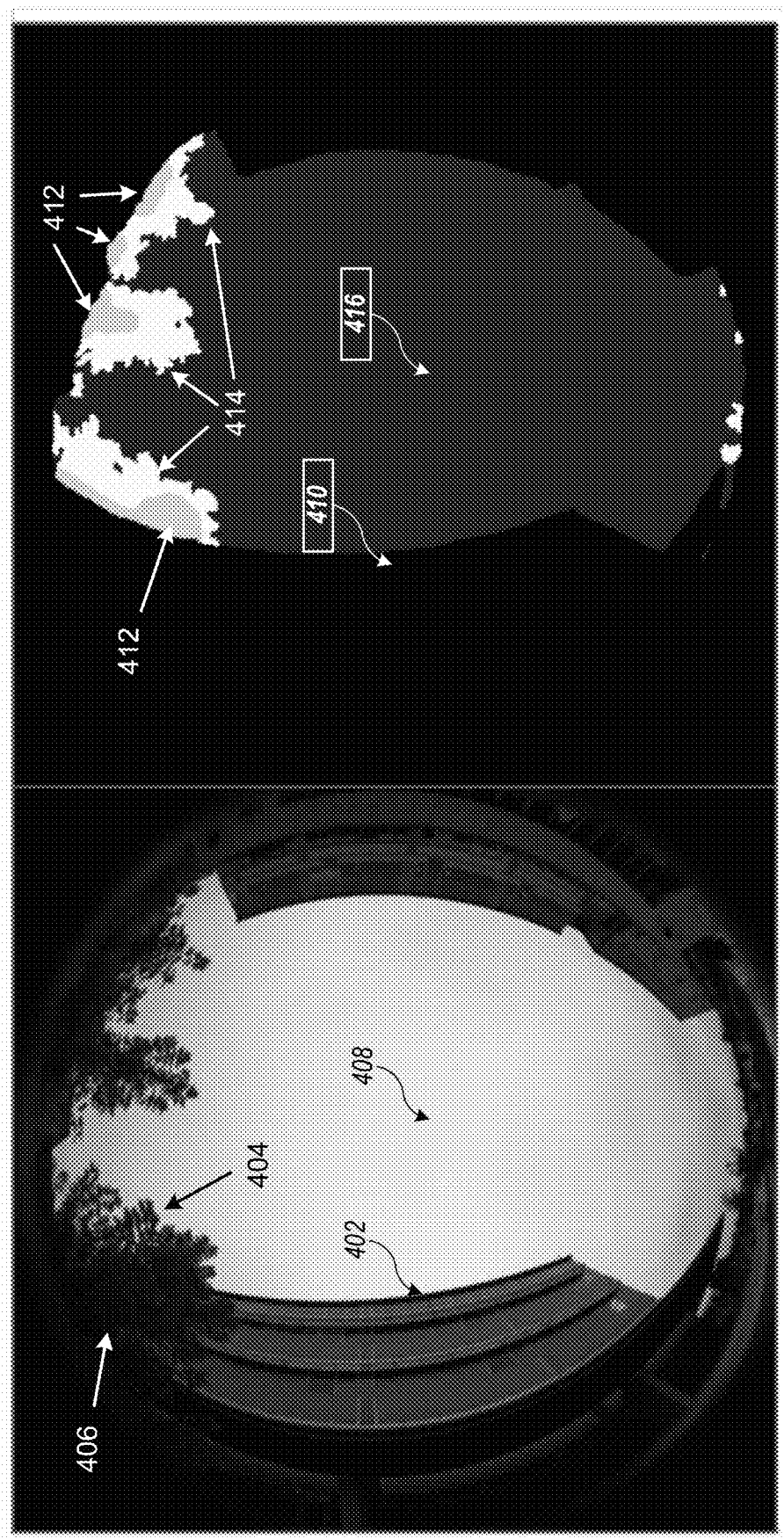
FIG. 4A is an image from an upward facing camera through a fisheye lens, according to embodiments.
FIG. 4B is a diagram of the segmentation of the camera image of FIG. 4A, according to embodiments.
Figure 7:
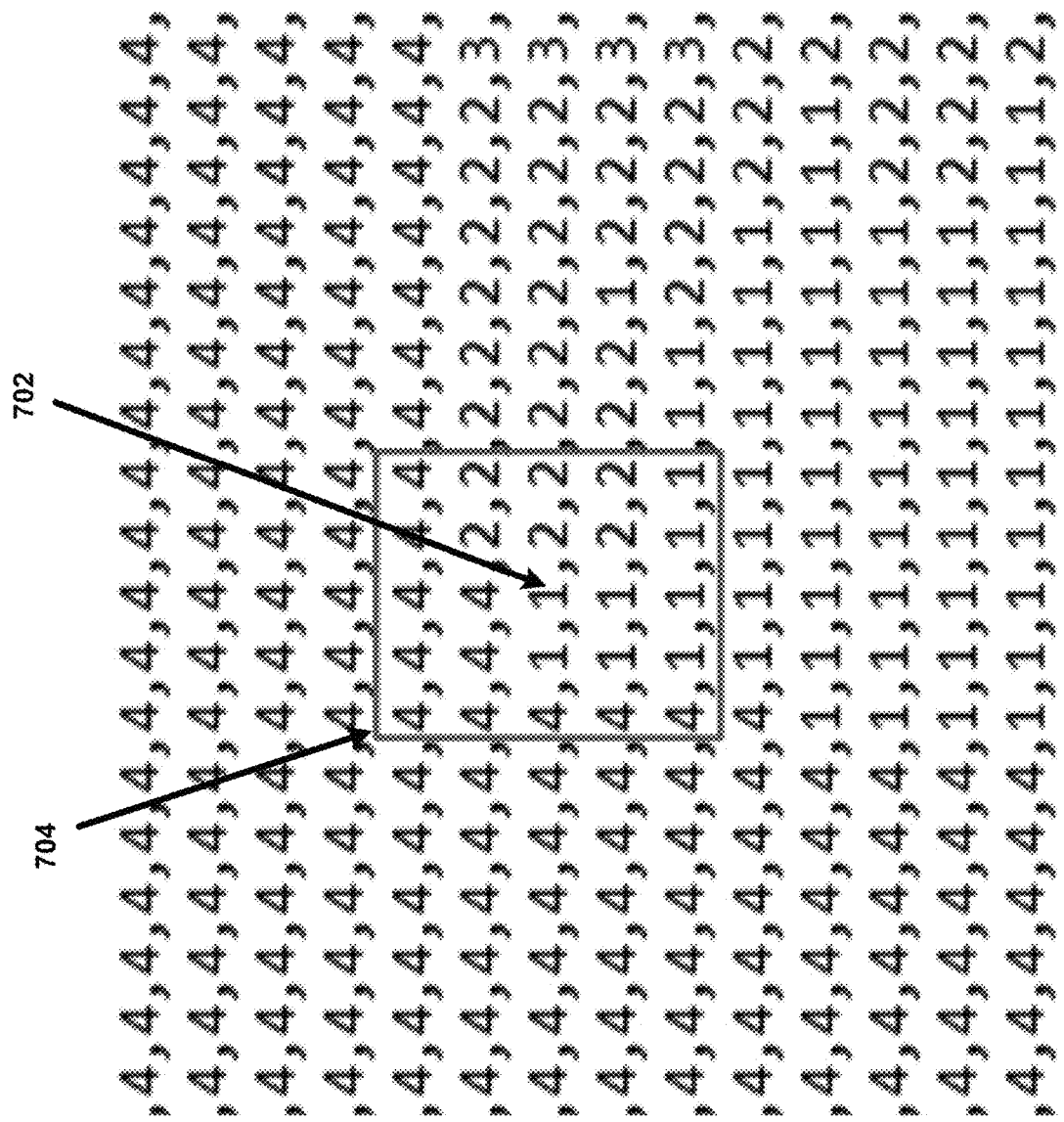
FIG. 7 is a diagram illustrating a window around an estimated satellite location in the matrix of FIG. 6, according to embodiments.

In particular, disclosed are a method and apparatus are provided for determining the amount of obstruction of a view of a satellite. A sensor Field of View (FOV) shown in FIG. 4A is converted into obstruction segments shown in FIG. 4B according to the amount of obstruction. This is then transformed into an elevation v. azimuth matrix or table shown in FIG. 5, with the obstruction values of a portion of that matrix shown in the example of FIG. 6. An estimated satellite location from a satellite signal is mapped to the matrix of obstructions. FIG. 7 shows a window 704 that is determined around the satellite location and all the obstructions within the window are considered in determining whether the satellite is obstructed, with the window considering the degree of possible error within the various measurements. In embodiments, the window size if varied based on the estimated amount of error and location of the satellite within the matrix.

Embodiments described herein relate to location determination using global navigation satellite system (GNSS) signals. As used herein, GNSS refers generally to any constellation of satellites that broadcast signals receivable by an antenna. A GNSS receiver system, which generally includes an antenna and appropriately-configured receiver and signal processing circuitry, can determine a location of the antenna using signals received by the antenna from multiple satellites. Examples of GNSS include the Global Positioning System (GPS) (operated by the United States), GLONASS (operated by Russia), Galileo (operated by the European Space Agency), and/or BeiDou (operated by China). GNSS satellites may transmit signals at one or more frequencies (or wavelengths). For instance, all GPS satellites currently broadcast at frequencies referred to as "L1" (1575.42 MHz, wavelength about 0.19 m) and "L2" (1227.60 MHz, wavelength about 0.24 m); some also broadcast at "L5" (1176.45 MHz, wavelength about 0.25 m). A given GNSS receiver system may be configured to detect and process signals from any or all of these or other GNSS satellites and may use conventional or other techniques to extract a location measurement from received satellite signals based on code phase and other data encoded in the signal (e.g., ephemeris data indicating satellite locations); other information such as carrier phase, Doppler shift, and the like may also be exploited. For example, where two GNSS receiver systems capable of determining carrier phase are available, real-time kinematics (RTK) can be used to produce a high-precision location estimate. Other techniques, such as precise point positioning (PPP), can also be used. A location determined using GNSS signals can be expressed in various formats, including coordinates indicating latitude, longitude, and/or altitude.

Surveying System

Figure 1:
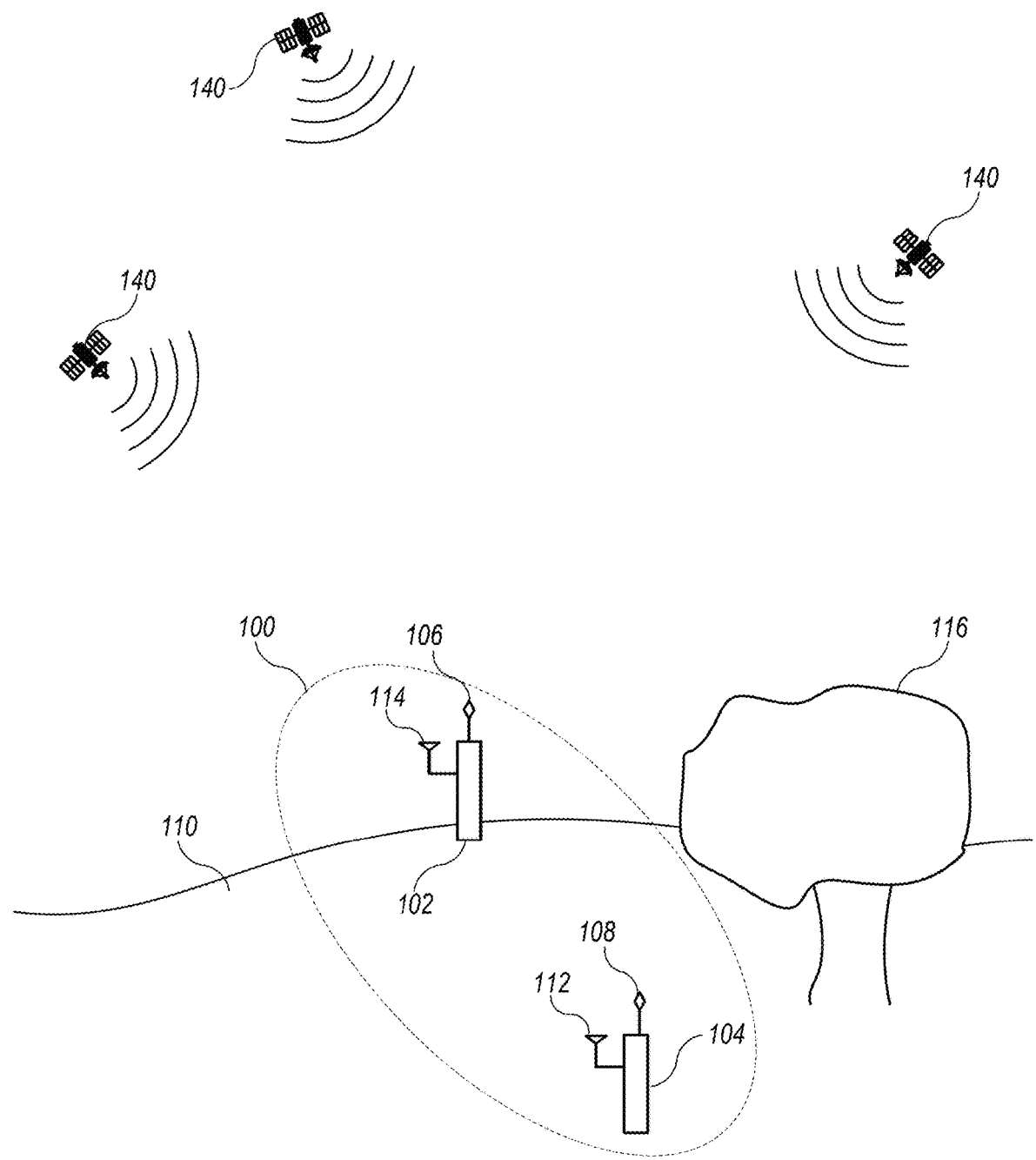
FIG. 1 shows a simplified diagram of a location-determining system according to some embodiments.

FIG. 1 shows a simplified diagram of a location-determining system 100 according to some embodiments. System 100 includes a base unit 102 and a rover unit 104 that can be used to measure locations in an area 110. Each of base unit 102 and rover unit 104 is equipped with an antenna to receive GNSS signals from satellites 140. In the example shown, base unit 102 has GNSS antenna 106, and rover unit 104 has GNSS antenna 108. Base unit 102 can be placed at a convenient location within area 110 and remain in that location for the duration of a survey operation (e.g., minutes, hours, days, depending on the application). The location of base unit 102 can be selected to avoid obstructions such as tree 116, providing a clear view of the sky. In particular, base unit 102 can have a direct communication path to receive signals from GNSS satellites 140 located in orbit. The particular number of GNSS satellites 140 with which base unit 102 communicates can be at least three, at least four, or a larger number. Those skilled in the art will appreciate that GNSS satellites 140 are generally not in geostationary orbits and may move relative to base unit 102. Thus, base unit 102 may receive signals from different combinations of GNSS satellites 140 at different times. Ideally, base unit 102 is located in a place where it is able to continually receive signals from a sufficient number of GNSS satellites 140 to establish and maintain a high-quality location fix for as long as the survey operation continues. Base unit 102 can remain at a fixed location while rover unit 104 is moved around to different locations within area 110 to obtain location measurements. In some embodiments, base unit 102 and rover unit 104 can support high-precision location determination techniques, including carrier phase detection. Real-time kinematics (RTK) can be used to determine the location of rover unit 104 with high precision, and base unit 102 can communicate with rover unit 104 to implement RTK. Other techniques, such as precise point positioning (PPP), can also be used, and a base unit is not required. In some implementations, base unit 102 may use PPP to determine its own location while rover unit 104 implements RTK using carrier phase data and/or other information provided by base unit 102. Accordingly, base unit 104 can include a radio-frequency (RF) communication antenna 114, and rover unit 104 can include a RF communication antenna 112. Antennas 114 and 112 can support wireless communication (e.g., in the UHF band) between base unit 102 and rover unit 104.

As rover unit 104 is moved around within area 110, the GNSS signal quality may be affected by obstructions such as tree 116. In particular, rover unit 104 may be susceptible to multipath effects, in which some (or all) of the GNSS signals bounce off an obstruction rather than taking a direct path from a satellite 140 to receiver antenna 108 of rover unit 104. Such effects can introduce error that reduces the accuracy of the location determined from the GNSS signals. As described below, antenna 108 in rover unit 104 (and/or antenna 106 in base unit 102) can be used to compensate for multipath effects.

Figure 2A:
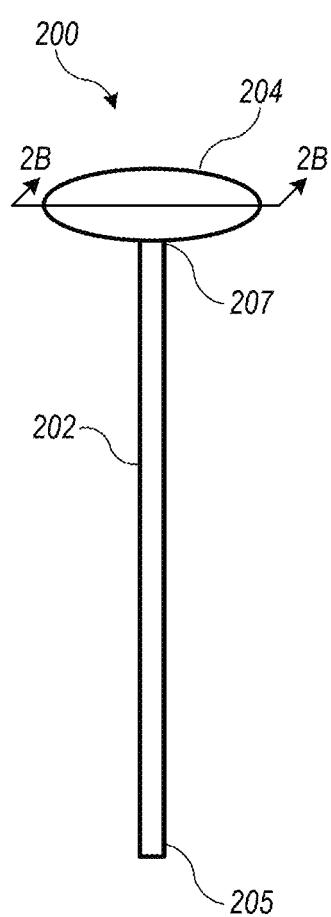
FIGS. 2A and 2B show side and section views of a location-measuring device according to some embodiments.

FIG. 2A shows a simplified side view of a location-measuring device 200 according to some embodiments. Location-measuring device 200 can be used to implement rover unit 104 or base unit 102 of system 100 of FIG. 1. In some embodiments, each of rover unit 104 and base unit 102 can be an instance of location-measuring device 200, with the difference being in operation rather than hardware components. Location measuring device 200 can include a pole 202 and an electronics module 204 mounted at a top end 207 of pole 202. Bottom end 205 of pole 202 can be placed on the ground to support device 200, and pole 202 can be long enough to elevate electronics module 204 to a desired height above ground level. If desired, the length of pole 202 can be adjustable. Although not shown in FIG. 2A, pole 202 can include or be attached to tripod legs, spikes, cleats, or other structures to further stabilize pole 202 during location measurements.

Figure 2B:
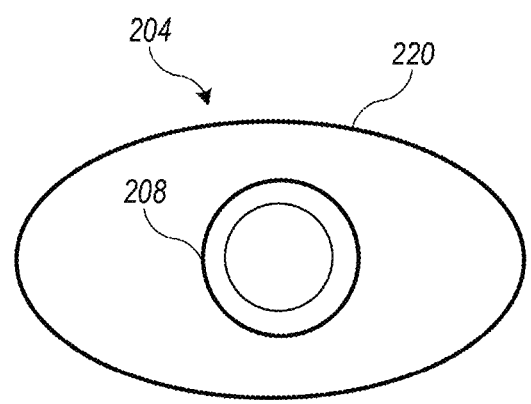

FIG. 2B shows a simplified cross-section view of electronics module 204, through line 2B of FIG. 2A. Electronics module 204 can have a housing 220, within which are mounted a GNSS antenna 208. Antenna 208 is sized and shaped to receive GNSS signals at one or more frequencies.

In some embodiments, antenna 208 can also be used to determine a carrier phase of the GNSS signal, e.g., using known techniques. In addition to antenna 208, electronics module 204 can also include other components disposed within housing 220, such as receiver circuitry, signal processing engine(s), an inertial measurement unit, communication circuitry to communicate with a base unit (or rover unit), battery or other power source, and so on. The size and shape of housing 220 can be varied as desired, provided that there is sufficient space to house the relevant components.

Figure 3:
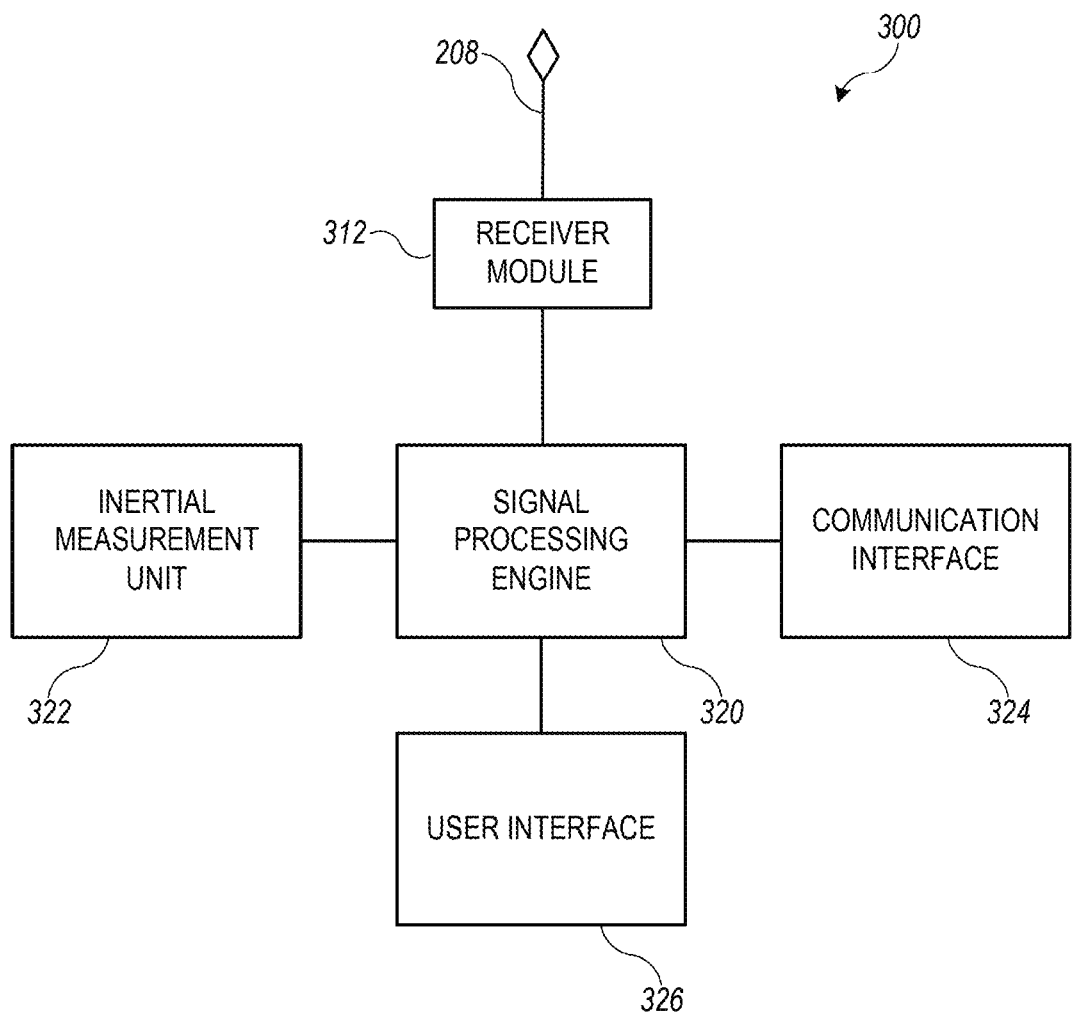
FIG. 3 shows a simplified block diagram of a GNSS receiver system according to some embodiments.

FIG. 3 shows a simplified block diagram of a GNSS receiver system 300, such as location-measuring device 200 according to some embodiments. In various embodiments, some or all components of GNSS receiver system 300 can be included in electronics module 204 of FIGS. 2A and 2B. As shown in FIG. 3, GNSS receiver system 300 can include antenna 208; receiver module 312; a signal processing engine 320; an inertial measurement unit 322; a base unit interface component 324; and a user interface component 326.

Antenna 208 can be of the same size and configuration and tuned (or tunable) to GNSS signal frequencies. Receiver module 312 can be coupled to antenna 208 and can include electronic circuitry to amplify received GNSS signals, determine carrier phase, convert signals to baseband, and extract data from the signals.

Signal processing engine 320 can include logic circuitry (e.g., fixed-function ASIC and/or a programmable microprocessor or microcontroller) configured to perform signal processing operations on data provided by receiver module 312. For instance, signal processing engine 320 can be configured to determine a location (e.g., latitude, longitude, and altitude) based on the data provided by receiver module 312. Examples of techniques that can be implemented in signal processing engine 320 are described below.

Communication interface 324 can include RF communication circuitry, antennas and the like, which can be of conventional or other design. In some embodiments, communication interface 324 can be operated to provide data from a base unit (e.g., base unit 102 of FIG. 1) to a rover unit (e.g., rover unit 104) of FIG. 1. For instance, in embodiments where signal processing engine 320 of rover unit 104 implements RTK, communication interface 324 can be used to obtain carrier phase data and any other relevant data from base unit 102.

Inertial measurement unit (IMU) 322 can include a combination of sensors such as accelerometers, gyroscopes, compass, or the like, which can be of conventional or other design. In some embodiments, IMU 322 can be used to determine and provide a spatial orientation (e.g., pitch, roll, yaw) of electronics module 204. The spatial orientation provided by IMU 322 can be used in determining the location of a virtual antenna (e.g., as described below) and/or the base of pole 202.

User interface 326 can include components such as buttons, dials, keypad, display, touch screen, speakers, microphones, or the like to enable a user to interact with GNSS receiver system 300. For instance, a user may be able to initiate a location measurement using a button and/or read a location measurement using a display. These and/or other interactions can be supported. In some embodiments, GNSS receiver system 300 may be remotely operable and can include a communication interface to exchange signals with a remote-control device. Wired or wireless communication protocols can be used, and a particular scheme for control input and data output is not relevant to understanding the present disclosure.

It will be appreciated that location-measuring device 200 and GNSS receiver system 300 are illustrative, and that variations or modifications are possible. Receiver systems can have any desired form factor, provided that the two antennas can be accommodated. In addition, some or all components of GNSS receiver system 300 can be located remotely from other components. For instance, the signal processing engine may be housed in a separate device that communicates via wired or wireless channels with a device that includes the antennas, receiver modules, and IMU.

Navigation System

In addition to the surveying system described above, the present invention is applicable to vehicles with GNSS systems, whether they are autonomous vehicles or driver-controlled vehicles. The GNSS module and the upward facing camera are both mounted on the vehicle, usually in close proximity. The predicted path of the vehicle and velocity can be obtained from the vehicle control system. Thus, additional information is available on whether a satellite is about to be obstructed or is about to come out from behind an obstruction. Alternately, a location determining system can be mounted in a smartphone, smart watch, a wearable device or any other portable device.

GNSS Problem Addressed

Depending on location and the amount of obstructions (trees, buildings, mountains, etc.) anywhere from a few to 20-40 satellites may be in view or partially in view. It is desirable to only use only satellite signals that are not obstructed to avoid location errors.

In embodiments, a location determining device or module is part of a surveying or navigation system. The device includes a GNSS module (e.g., chip), an Inertial Measurement Unit (IMU) and an upward looking camera. An example processing workflow is the following:

1) Capture an image with the camera.
2) Use the camera's intrinsic calibration parameters to remove any camera specific errors (lens distortion for example).
3) Segment the image into regions (trees, buildings, etc.) based on the amount of obstruction of a satellite signal.
4) Use extrinsic parameters of the camera and GNSS module parameters to determine where the satellite is in the image. These extrinsic parameters include (a) where is the camera/image relative to the GNSS center, (b) satellite locations (from ephemeris data), and (c) attitude of the platform on which the device is mounted.
5) Use the position (pixel coordinate) of the satellite in the image, and the segmentation of obstructions results, to perform a satellite selection process. For example, if a satellite is behind a building do not use it.

However, there are many sources of potential errors in determining the satellite position with respect to obstructions. An error-free determination would require the following: a) The intrinsic parameters from #2 are correct or have not changed. b) The segmentation from #3 is correct, every pixel is correctly labeled. c) The extrinsic parameters from #4 are correct or have not changed. d) The attitude angles from #4 are correct and have no errors. e) The impact of the satellite behind a building or tree is instantaneous, as soon as the satellite goes behind a building the measurements get an immediate increase in error which is not the case. In addition, there is generally about 1-2 seconds of delay of the satellite signal, so it may have already moved behind an obstruction, or have cleared an obstruction. These are referred to here as satellite classification transitions.

If any of the above statements are incorrect, which is the most likely scenario (no system is perfect or measurements without error), the satellite classification of step #5 will be incorrect and most likely degrade the final positioning performance. For example, the satellite may actually be in open sky, but because of errors in attitude it gets classified (projected) as behind a building, therefore the system rejects the good Satellite Vehicle (SV). Conversely, the satellite may actually be behind a building but may be classified (projected) as in open sky so the system uses the bad SV. The most likely real world situation is there is an error in #2, #3, and #4 and all errors compound. This invention herein addresses these limitations.

Assuming any errors in calibration parameters, segmentation and attitude angle are reasonable and within expected ranges (but actual values are still unknown). For example if the true heading of the platform is 85 degrees, the IMU+GNSS system may be reporting 87 degrees, so there is a 2 degree error. The invention herein can correct for that since 2 degrees is well within the expected error of a IMU+GNSS heading system. Likewise, it can handle reasonable extrinsic calibration errors, camera shifts relative to the GNSS either due to wear and tear, temperature, or errors in initial calibration parameters.

Segmentation Matrix

FIG. 4A is an image from an upward facing camera through a fisheye lens, according to embodiments. Various obstructions of the sky can be seen in the image. There are buildings 402 which are a solid obstruction. There are also trees with less dense, partially obstructed areas 404 and denser, more obstructed areas 406. Finally, there is clear blue sky 408.

FIG. 4B is a diagram of the segmentation of the camera image of FIG. 4A, according to embodiments. In this example, the camera image has been segmented into four areas of obstructions. The obstructions are assigned obstruction values from 1-4, with one being no obstruction (clear blue sky) and 4 being completely obstructed (e.g., a building). As shown, segment 410 is completely obstructed, corresponding to the building 402 of FIG. 4A. Segment 410 is assigned an obstruction value of 4. Segment 412 corresponds to the denser parts of trees 406 in FIG. 4A, and is assigned a value of 3. Segment 414 corresponds to the less dense portion of the trees 404 in FIG. 4A, and is assigned the value of 2. Segment 416 corresponds to the clear blue sky 408 of FIG. 4A, and is assigned the value of 1.

Figure 5:
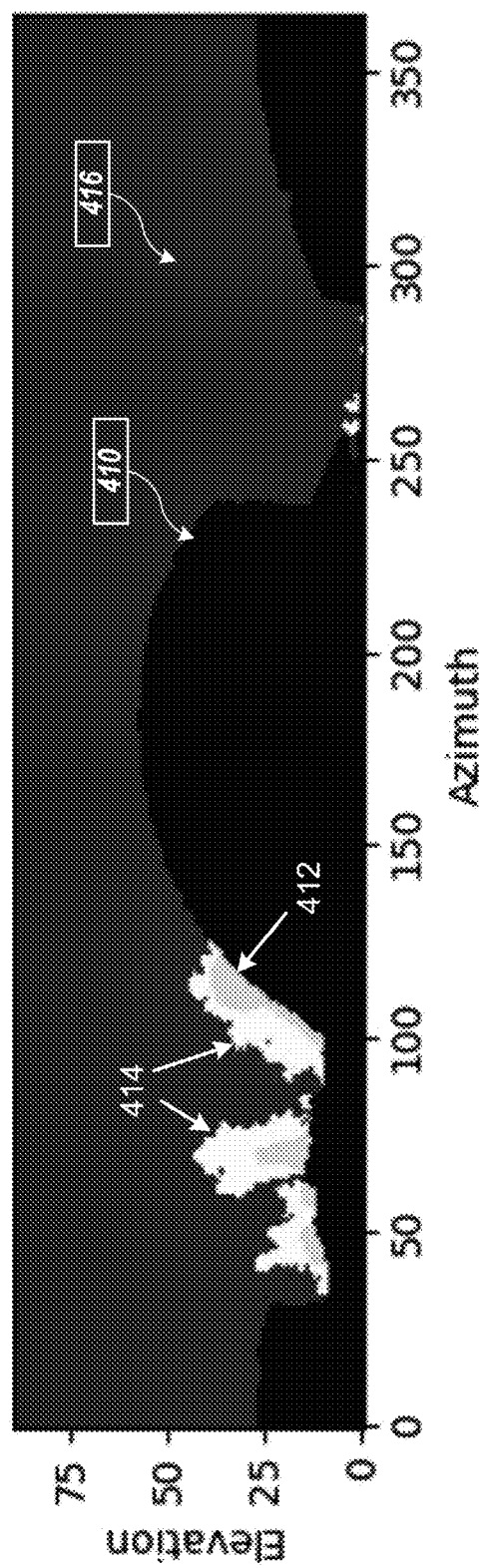
FIG. 5 is a diagram of the segmentation of FIG. 4B transformed into a matrix of elevation angle versus azimuth angle, according to embodiments.

FIG. 5 is a diagram of the segmentation of FIG. 4B transformed into a matrix of elevation angle versus azimuth angle, according to embodiments. Each row of the matrix is the elevation angle (1, 2, 3, . . . 90), and each column is the azimuth angle (1, 2, . . . 360), shown in FIG. 2. This transformation makes it easier to extract the segmentation value at a given elevation/azimuth value.

Figure 6:
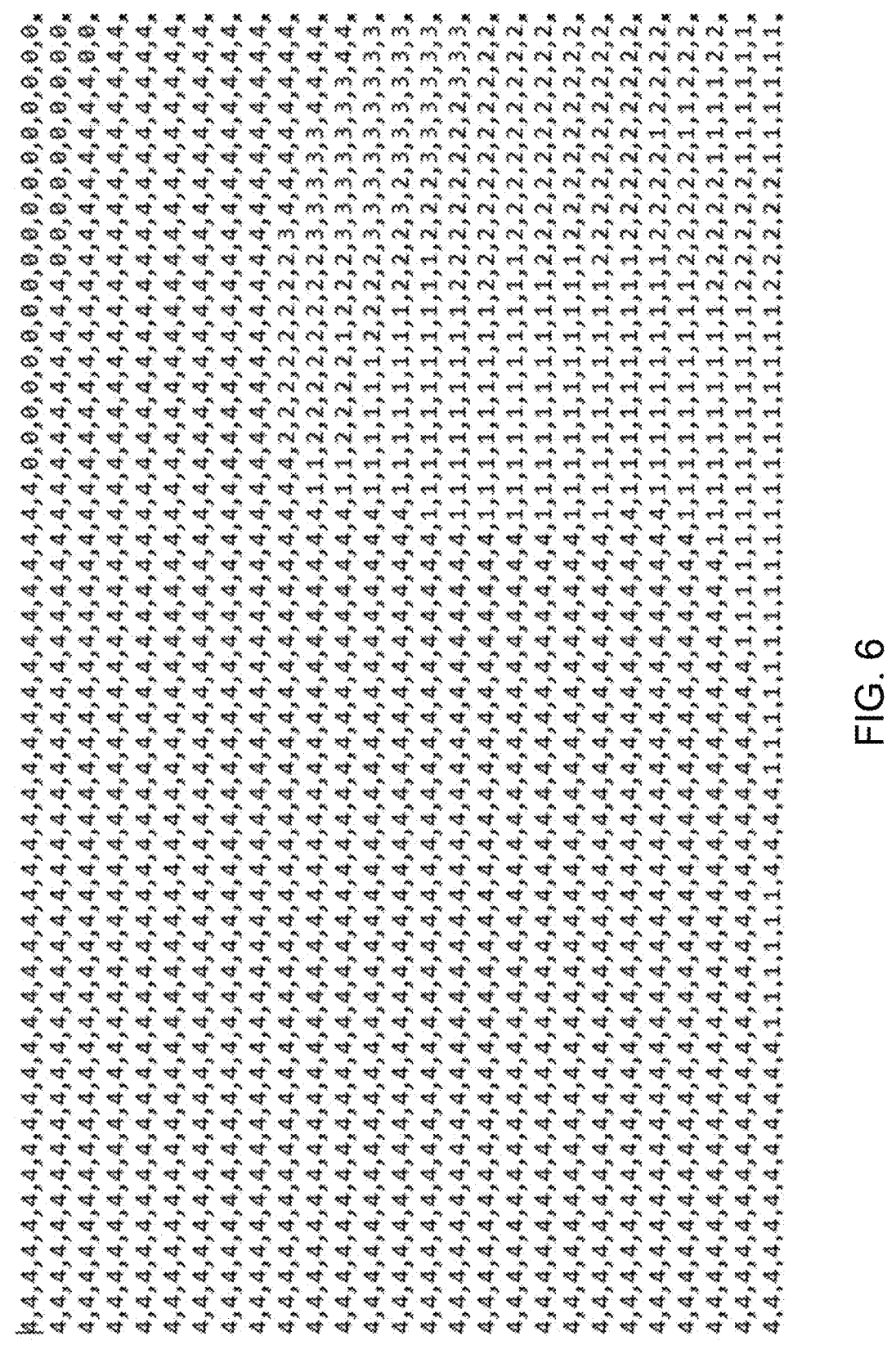

FIG. 6 is a diagram illustrating a subset of the segmentation matrix of FIG. 5 illustrating how it is represented in memory, according to embodiments. The memory stores the obstruction values for each pixel or sub-pixel, from 1-4. Alternately, other ranges of obstruction could be used, such as 1-10 or 1-20. The resolution of the segmentation matrix (number of rows and columns in FIGS. 5-6) will be a function of the original camera image resolution and other design/engineering constraints. For example, one embodiment may use a 2 MP image, downsampled to 512×512 image, then transformed to a 1×1 degree matrix. However, a larger or smaller resolution matrix could be used. There is a tradeoff on computation speed and accuracy. A larger matrix may be more accurate but require more time to compute a window for not much more accuracy. Likewise, a smaller matrix is faster to compute but likely won't be as accurate. This segmentation matrix in memory in the system is just a matrix where each element value represents the segmentation result (obstruction value). A value of 4 represents obstructed, and a 1 is open sky.

If the standard workflow outlined previously is used, using the segmentation matrix and the satellite azimuth and elevation angle, a simple look up is done into the segmentation matrix to determine the classification. For example, if the satellite is at an elevation angle of 45, that would be row 45 in the matrix. Likewise, an azimuth of 255 is column 255 (assuming 1 degree resolution). However, this again assumes there are no errors in the system.

FIG. 7 is a diagram illustrating a window around an estimated satellite location in the matrix of FIG. 6, according to embodiments. The estimated satellite location is plotted at pixel 702. This is called the "estimated" location because there are various errors in the system, as noted above. Accordingly, according to the present invention, a window 704 is drawn around the satellite location. The example shown is a 5×5 window, but the window size can vary, as discussed below.

The satellite location 702 is obtained from the satellite signal, as described above. Window 704 is then determined with location 702 at the center of the window. Without the window, the satellite would get a classification of open sky (1). However, a slight error one direction or the other would put the classification at a 2 or 4. Accordingly, the distribution of obstruction values in the window 704 is used to determine the classification of the satellite. In one embodiment, the distribution is used by determining the mean value of the values in the window to give a better approximation of the environment the satellite is in. In the example of FIG. 7, the mean value of window 704 is 2.5, so the satellite is more likely to be not open sky (not close to a value of 1), so it should not be treated as open sky.

The mean value compensates for any errors in the system. If there is a 2-degree heading error in the system (which is an expected value), the window would shift 2 columns left or right and the non-windowing approach would give a classification of 4 or 2 (depending on the sign of the error, which is unknown).

In one embodiment, the standard deviation of the values in the window is calculated as well. This gives an indication of how much variation is occurring in the environment. The closer the standard deviation to 0, the more confidence can be assigned to the classification from the mean. If all values in the window are 1, the mean is 1 and standard deviation is 0. Thus, a high confidence level is assigned, since it is reasonably certain that the satellite is in open sky.

In another example, one row in the window (5 elements) are all 4s (obstructed), and the remaining elements of the window are all 1s (open sky). The mean value is 1.6, however the standard deviation is high at 1.2. Given the larger standard deviation the SV is likely near a transition (going from building to sky, or sky to building). Thus, the standard deviation can be used to weight the reliability of the mean.

This window approach provides an improved satellite selection and weighting scheme. Elements of the windowing system can be varied. For example, rather than using a mean, an average or a gaussian filter could be used. A gaussian filter weights the center values more, and deweights closer to window edges. Also, the median deviation could be used instead of the standard deviation. The median deviation or standard deviation is used to weight the determined classification by giving a confidence level. For example, the classification value can be divided by the standard deviation, or the standard deviation can be added to the classification value. For example, a classification of 1.5 might indicate the satellite should be used, but adding a standard deviation of 1 would push it to 2.5, indicating that it should not be used (e.g., assigned a weight of zero).

Dynamic Window Sizing.

In some embodiments, a fixed window size is used. In one embodiment, a default 5×5 degrees window is used, with each pixel corresponding to one degree. Each degree may correspond to multiple pixels, a single pixel, or a fraction of a pixel. The inventors have determined that current apparatus typically have a cumulative error of 4 degrees or less. Accordingly, a window of 4×4 degrees, or slightly larger (5×5, 6×6 or 7×7) is usually sufficient.

In other embodiments, the size of the window can be changed dynamically and on a satellite-by-satellite basis. For example, The GNSS+IMU attitude system provides error estimates. If the error estimates are <1 degree, the window could be narrowed. If the error estimates are >2 degrees, the window can be increased.

Given the physical implementation of a fish-eye lens, there may not be a uniform pixel to degree spacing across the image. This means the window size can be increased or decreased if the satellite is low elevation (near the lower limits of the lens) or high elevation (center of the lens). Also, if the system detects, or thinks there may be an error in camera calibration parameters the window size can be increased to compensate for that.

Most current GNSS+IMU systems now allow users to work with non-level survey poles. This means there will also be errors in roll and pitch. This approach outlined here would still work. The window size would change again based on the provided uncertainty from the GNSS+IMU system.

In embodiments, the above approach is reversed. Instead of transforming the image to a segmentation matrix and superimposing the satellite location, the satellite location can first be plotted on an elevation vs. azimuth table. The image can then be transformed and overlayed on the table. The window could be applied before or after the overlay. This could potentially be more beneficial if the image is higher resolution than the final table.

Results.

Figure 8:
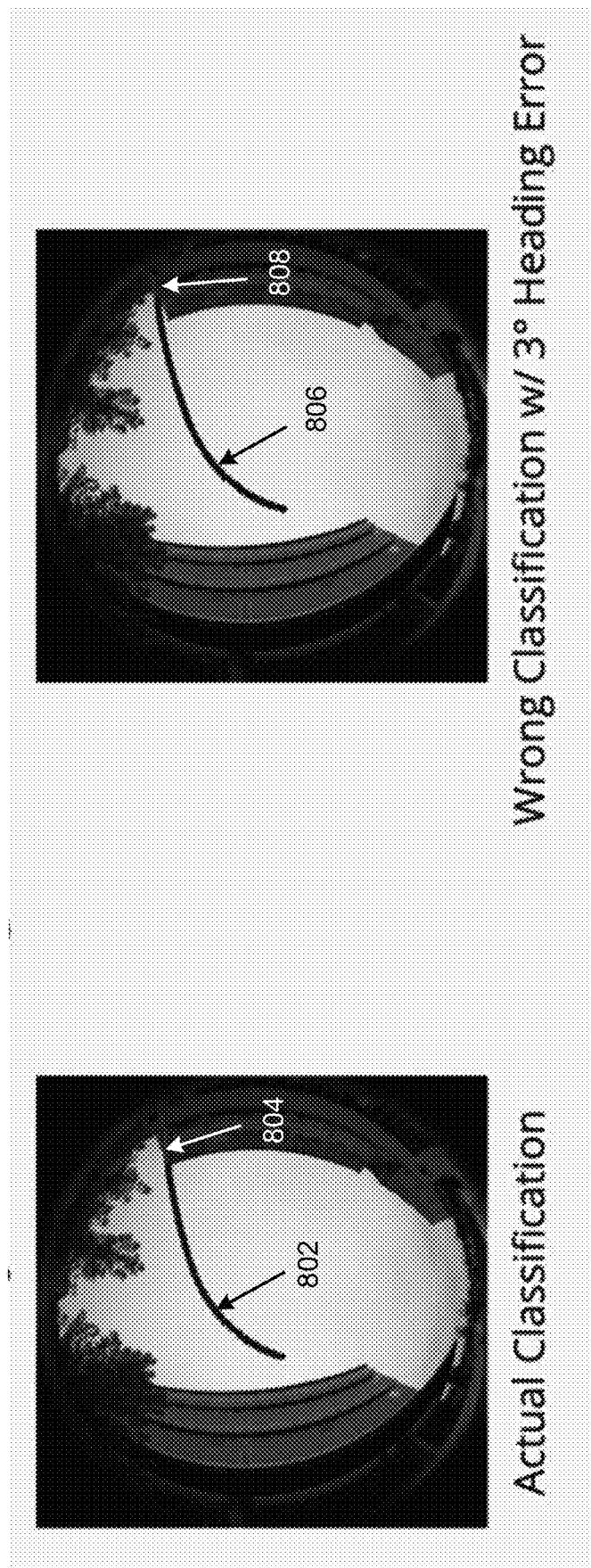
FIGS. 8A-B are diagrams illustrating the difference in satellite location without errors and with errors, according to embodiments.

FIGS. 8A-B are diagrams illustrating the difference in satellite location without errors and with errors, according to embodiments. FIG. 8A shows the mapping of the satellite path onto an image with classifications for the satellite without any errors. The satellite path is the collection of the estimated locations of the satellite over time. FIG. 8B shows the same mapping, but with a 3 degree heading error added. FIG. 8A shows satellite path 802 being obstructed by a building at position 804, and thus it should not be used at position 804. With the 3 degree error, FIG. 8B shows the satellite path 806 being clear of the building at portion 808, causing it to be considered in blue sky and used. This results in a location error, since the signal is actually unreliable as shown in FIG. 8B. By using the windowing approach set forth above, the system realizes that the portion 808 is close to a building, and with errors may be behind the building, so it is not used.

Figure 9:
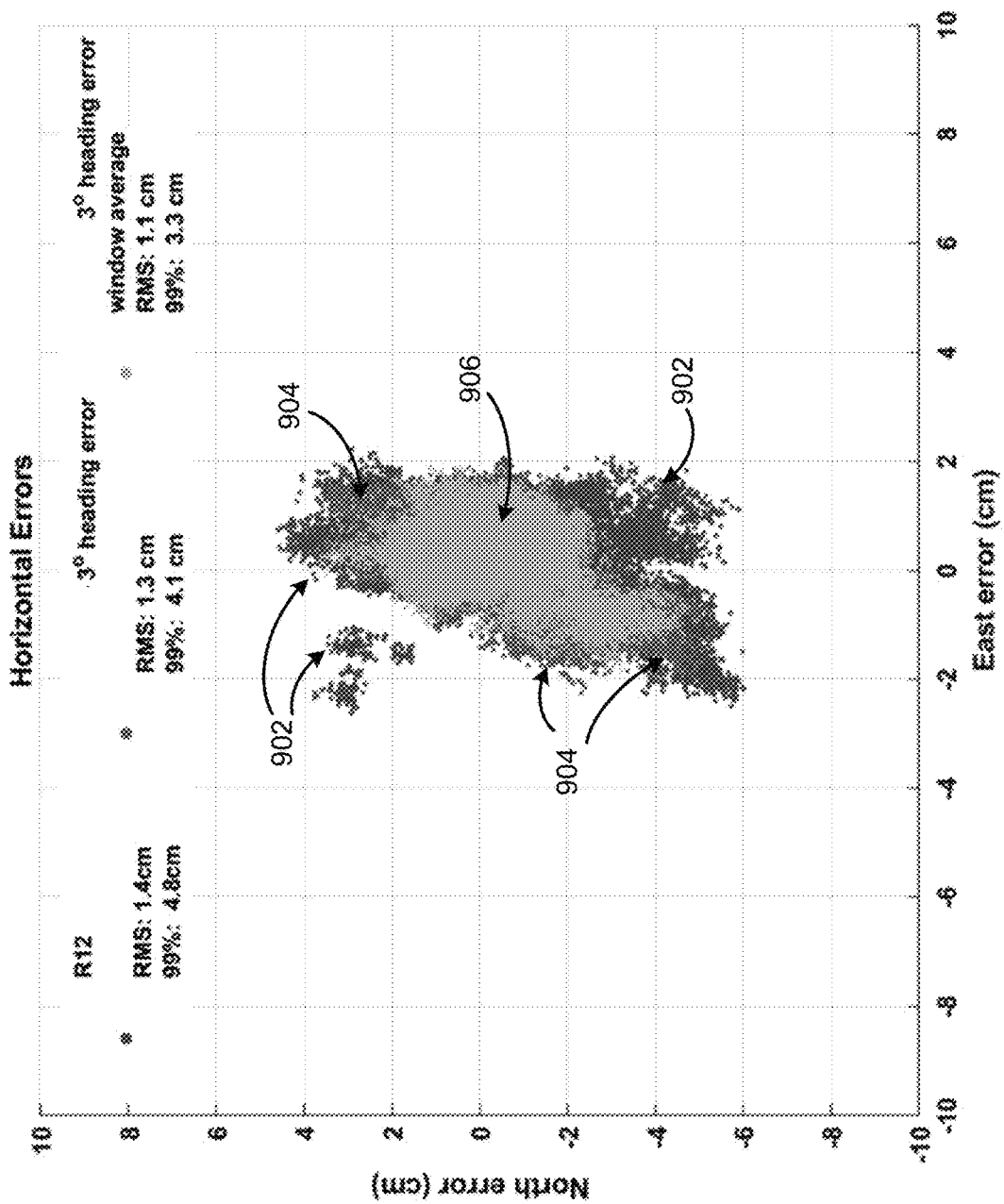
FIG. 9 is a diagram illustrating the errors of embodiments vs. the standard approaches in vertical and horizontal directions, according to embodiments.

FIG. 9 is a diagram illustrating the horizontal errors of embodiments vs. the standard approaches, according to embodiments. Areas 902 show the significant errors in position determined from a standard GNSS measurement processing engine. Area 902 shows the errors by processing all signals/measurements received from a GNSS receiver, which is around 4-6 cms in a single North/East direction.

Area 904 shows processing the measurements in the same GNSS position engine but rejecting the obstructed satellites with a 3-degree heading error, leading to wrong classifications (where the current invention is not being used). Area 906 shows processing the measurements in the same GNSS position engine but rejecting the obstructed satellites with a 3-degree heading error, with the current invention being used. Thus, the present invention improves upon 1) the state of the art (902), 2) and the wrong classifications (904).

Machine Learning

In some embodiments, a machine learning module is trained to recognize objects in a field of view of a camera and assign an obstruction value. The machine learning module can be trained with various obstruction objects, such as buildings, fences, telephone poles, transmission towers, trees, different foliage, mountains, clouds, etc. Objects of the same category can be further classified by examining how much they affect a satellite signal. For example, light foliage is less of an obstruction than heavy foliage and wood buildings are less of an obstruction than concrete or steel structures. There may be different amounts of obstruction depending on the type of foliage, such as pine trees versus broad leaf trees.

In some embodiments, the machine learning module results are compared to actual satellite obstruction and a grade or degree of confidence is assigned to different types of objects identified, depending on how well the machine learning module performs. For example, the machine learning module may correctly identify buildings only 80% of the time, while recognizing trees correctly 95% of the time. To account for this, the window can be made larger when the obstruction in the window is identified as a building, and a smaller window can be used when the obstruction is identified as trees. Alternately, different machine learning modules may be used, or the same machine learning module could improve over time. For example, a machine learning module trained on 1000 images may have a reliability of 80%, while a machine learning module trained on 20,000 images may have a 95% reliability.

Window Sizing

Figure 10:
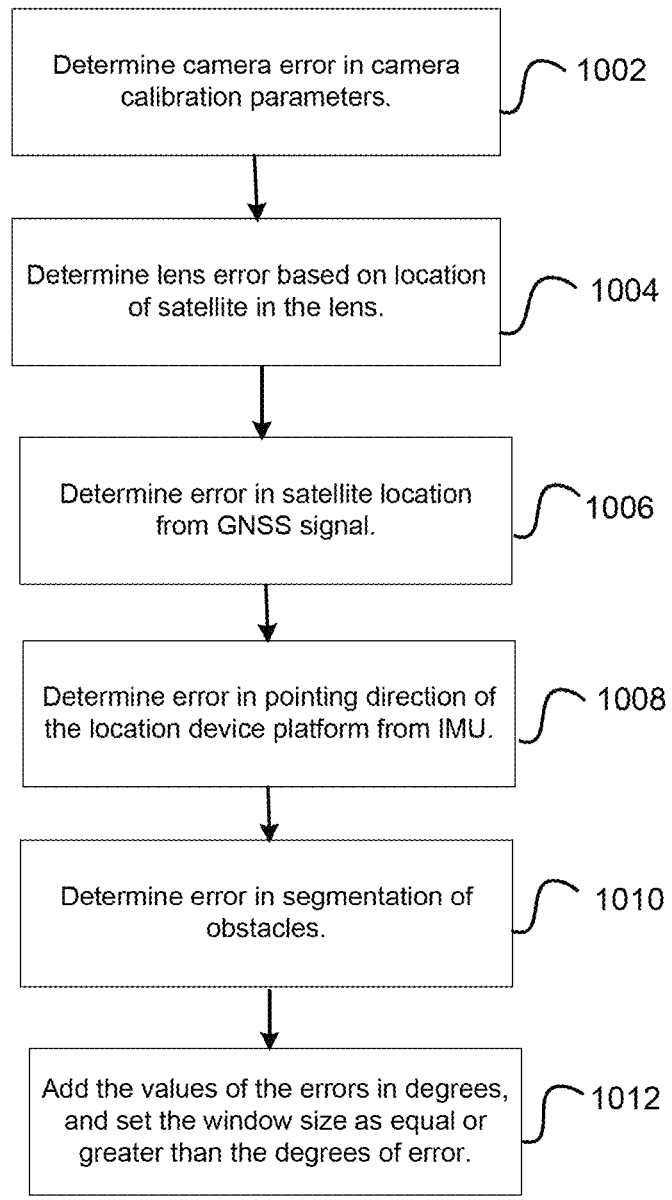
FIG. 10 is a flowchart illustrating the determination of the window size, according to embodiments.

FIG. 10 is a flowchart illustrating the determination of the window size, according to embodiments. In some embodiments, the window size is dynamically chosen based on a variety of factors which determine the amount of error, or uncertainty, in the location of the satellite relative to obstacles. There are generally two classes of errors. A first class of errors is errors in determining the satellite location in the sky. A second class of errors is errors in determining the location of obstacles in the image. These errors can either offset or be cumulative. To ensure that the amount of error is compensated for, they are assumed to be cumulative.

A camera manufacturer will provide calibration parameters to correct for anticipated errors due to camera construction. However, these calibration parameters may have errors. When choosing a model of camera for a surveying, vehicle or other location determination product, the camera error can be determined by laboratory tests and the corresponding number of degrees or fraction of degree of error can be stored in memory, as set forth in step 1002 of FIG. 10.

In step 1004 of FIG. 10, the amount of error of the lens is determined. This error is dynamically determined from the satellite signal based on the location of the satellite in the field of view (FOV) of the lens. For a fisheye lens, there is typically more distortion near the edges, and thus a larger degree or fraction of a degree of error is assigned to positions near the edges. Alternate lenses may be used, such as a micro lens array. Such an array may have a different error distribution depending on the location of the satellite in the FOV of the lens. When the product is assembled, the amount of error is stored in a look-up table in memory for the particular lens used, with an amount of error for each location in the table. The table is then consulted when the estimated satellite location is received from the satellite. Since the estimated location of the satellite may itself have an error, which could amplify or reduce the error of the lens, the conservative approach is to add this error in a direction of the lens with more error, and to use the lens error at that position.

In step 1006 of FIG. 10, the amount of error in the satellite location is determined. Typically, the GNSS receiver will provide this error from ephemeris data. It is typically calculated based primarily on the position of the satellite in the sky and the signal delay. Thus, since different satellites in the FOV of the camera will have different positions in the sky, they will have different errors associated with them, and thus are provided with different size windows.

In step 1008 of FIG. 10, the amount of error in the orientation of the platform on which the camera is mounted is determined. This is orientation error in pitch, roll and yaw. It is typically provided by an IMU unit. A single module may contain both the GNSS receiver and the IMU, and can either provide both errors separately, or can provide the combined error. Note that the GNSS error relates to the satellite location, which the IMU error contributes to error in the location of obstructions.

In step 1010 of FIG. 10, the amount of error in the segmentation of obstacles is determined. If a machine learning module is used, an amount of potential error based on the type of obstruction identified may be used. The error can be of two types. One is an error in determining the boundaries of an obstruction or object. Another is an error in determining the type of object, and thus the obstruction value.

In step 1012, all of the errors are added to give a cumulative maximum error. That error is used to set the window size. The window size is either set equal to the maximum error, or slightly higher. One reason to set the window slightly larger is that it is not instantaneous to determine that a satellite has gone behind an obstruction, or has come clear of the obstruction.

Thus, a fraction of a degree can be added to account for this.

Alternate Embodiments

In some embodiments, the location determination device is mounted on a survey pole. In other embodiments it is mounted on a vehicle, such as an autonomous or manually controlled car or truck, or farm equipment such as a tractor or grain harvester. It could also be mounted in boats, ships, planes and other airborne vehicles, such as drones. Alternately, the location determination device could be mounted in a personal computing device, such as a watch, smart phone, tablet, or portable computer. The direction of movement could be used in the satellite selection process. For example, if there are two satellites with equal obstruction, but the first one will soon be clear if the vehicle continues moving in the current direction, and the second one will be further obstructed in the current direction, the first satellite can be selected.

In some embodiments, instead of object recognition by machine learning or some other algorithm, the image is segmented based on the amount of light received. The pixels with the most amount of light are assumed to be open sky, or at least the best or least obstructed areas for satellite signals. The less light (darker) that a pixel receives, the more obstructed it is assumed to be.

In some embodiments, instead of the calculations being all done in the location determination device (e.g., surveying tool), some or all of the calculations can be done in another device. For example, a smartphone with a wireless communication capability with the surveying tool could do the determination of the cumulative error and setting the window size, for example. In addition, a machine learning module for obstruction classification and segmentation could be performed by an application on the smartphone. An application on the smartphone could be periodically updated. Alternately, the smartphone could separately connect through the cloud to a remote server for portions of the calculations, such as connecting to a remote machine learning module.

As described above, an upward facing camera is used in one embodiment to detect obstructions of a satellite signal. However, other sensors could be used instead of a camera, or in addition to a camera, such as LiDAR, radar, ultrasonic, etc. In some embodiments, instead of a camera, a LiDAR sensor could scan the sky. The LiDAR scan can provide the distance to objects, and show the density of some objects. For example, a group of pixels with the LiDAR signal all returned at about the same time, showing the same distance, indicate a solid obstacle, such as a building. If there is a mix of pixels at widely different distances, or some with no object detected, that could indicate a tree or foliage with a sparse coverage of the sky. In some embodiments, both a camera image and LiDAR could be used to provide a composite matrix.

In some embodiments, the standard deviation may be applied to a subset of pixels in the window. Also, depending on the density of pixels, only some of the pixels may be used to determine obstructions, such as every other pixel. Alternately, interpolation may be used to provide more pixels than are provided by the camera sensor. Interpolation may also be used to more precisely determine the estimated satellite location, and thus the center of the window. In some embodiments, a shape other than a square window may be used, such as a rectangle or other polygon, or a circle, oval, or other curved shape. A circular window, for example, may be more computationally complex, but more accurate.

In some embodiments, the image is not transformed into a matrix of elevation v. azimuth. Instead, pixel/image space is used directly. If a fisheye lens is being used, the projection of a 5×5 degree window in elevation/azimuth space that is transformed to pixel/image space would no longer have parallel lines (no longer be square). This makes the math/logic to use this invention slightly more involved but still possible. The invention can be used with all types of images and lenses, not just fisheye lenses.

Computer System

Figure 11:
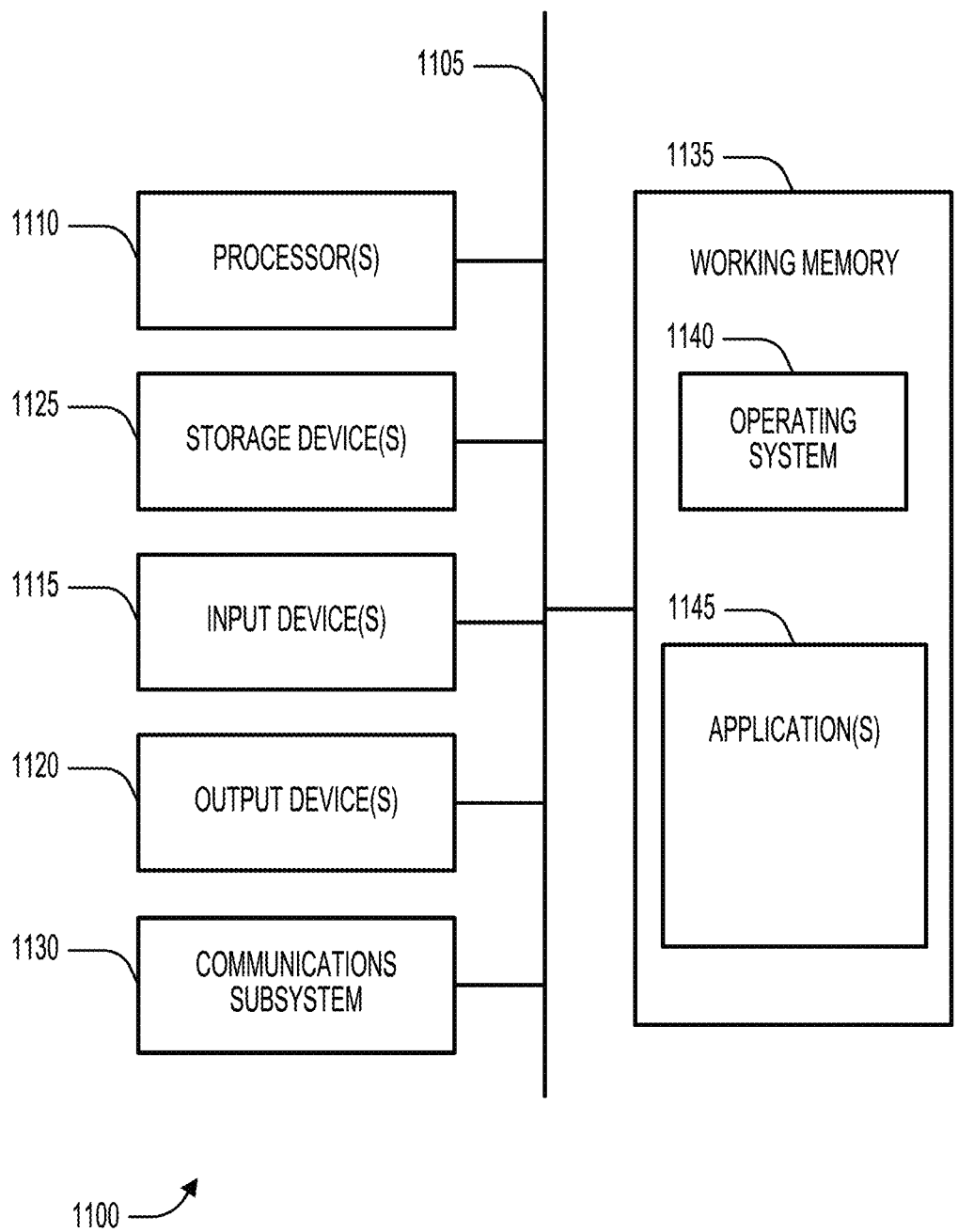
FIG. 11 illustrates a simplified computer system for implementing a signal processing engine for a location determination device, according to embodiments.

FIG. 11 illustrates a simplified computer system 1100, in accordance with some embodiments of the present disclosure. FIG. 11 provides a schematic illustration of one embodiment of computer system 1100 that can perform some or all of the steps of the methods provided by various embodiments, including the functions performed by signal processing engine 320 of FIG. 3. It should be noted that FIG. 11 is meant only to provide a generalized illustration of various components, any or all of which may be utilized as appropriate. FIG. 11, therefore, broadly illustrates how individual system elements may be implemented in a relatively separated or more integrated manner.

Computer system 1100 is shown comprising hardware elements that can be electrically coupled via a bus 1105, or may otherwise be in communication, as appropriate. The hardware elements may include one or more processors 1110, including without limitation one or more general-purpose processors and/or one or more special-purpose processors such as digital signal processing chips, graphics acceleration processors, and/or the like; one or more input devices 1115, which can include, without limitation a mouse, a keyboard, a camera, and/or the like; and one or more output devices 1120, which can include, without limitation a display device, a printer, and/or the like.

Computer system 1100 may further include and/or be in communication with one or more non-transitory storage devices 1125, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1100 might also include a communications subsystem 1130, which can include, without limitation a modem, a network card (wireless or wired), an infrared communication device, a wireless communication device, and/or a chipset such as a Bluetooth® device, an 802.11 device, a Wi-Fi device, a WiMax device, cellular communication facilities, etc., and/or the like. The communications subsystem 1130 may include one or more input and/or output communication interfaces to permit data to be exchanged with a network such as the network described below to name one example, to other computer systems, and/or any other devices described herein. Depending on the desired functionality and/or other implementation concerns, a portable electronic device or similar device may communicate image and/or other information via the communications subsystem 1130. In other embodiments, a portable electronic device, e.g., the first electronic device, may be incorporated into computer system 1100, e.g., an electronic device as an input device 1115. In some embodiments, computer system 1100 will further comprise a working memory 1135, which can include a RAM or ROM device, as described above.

Computer system 1100 also can include software elements, shown as being currently located within the working memory 1135, including an operating system 1140, device drivers, executable libraries, and/or other code, such as one or more application programs 1145, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by a computer and/or a processor within a computer; in an aspect, then, such code and/or instructions can be used to configure and/or adapt a general-purpose computer or other device to perform one or more operations in accordance with the described methods.

A set of these instructions and/or code may be stored on a non-transitory computer-readable storage medium, such as the storage device(s) 1125 described above. In some cases, the storage medium might be incorporated within a computer system, such as computer system 1100. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1100 and/or might take the form of source and/or installable code, which, upon compilation and/or installation on computer system 1100 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as computer system 1100 to perform methods in accordance with various embodiments of the technology. According to a set of embodiments, some or all of the procedures of such methods are performed by computer system 1100 in response to processor 1110 executing one or more sequences of one or more instructions, which might be incorporated into the operating system 1140 and/or other code, such as an application program 1145, contained in the working memory 1135. Such instructions may be read into the working memory 1135 from another computer-readable medium, such as one or more of the storage device(s) 1125. Merely by way of example, execution of the sequences of instructions contained in the working memory 1135 might cause the processor(s) 1110 to perform one or more procedures of the methods described herein. Additionally, or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1100, various computer-readable media might be involved in providing instructions/code to processor(s) 1110 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1125. Volatile media include, without limitation, dynamic memory, such as the working memory 1135.

Common forms of physical and/or tangible computer-readable media include, for example, a floppy disk, a flexible disk, hard disk, magnetic tape, or any other magnetic medium, a CD-ROM, any other optical medium, punch-cards, paper tape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1100.

The communications subsystem 1130 and/or components thereof generally will receive signals, and the bus 1105 then might carry the signals and/or the data, instructions, etc. carried by the signals to the working memory 1135, from which the processor(s) 1110 retrieves and executes the instructions. The instructions received by the working memory 1135 may optionally be stored on a non-transitory storage device 1125 either before or after execution by the processor(s) 1110.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for determining an amount of obstruction of a view of a satellite from a location determination device, comprising:
  receiving a satellite signal;
  extracting a satellite location measurement from the received satellite signal;
  receiving a sensor signal from a sensor;
  determining obstructed areas in a field of view of the sensor that are at least partially obstructed;
  determining an estimated location of the satellite in the field of view of the sensor;
  determining a window of locations around the estimated location of the satellite;
  determining a likelihood of obstruction of the satellite signal from an overlap of the obstructed areas and locations in the window, including locations other than the estimated location of the satellite; and
  determining an amount of weight to give to the satellite signal in determining a location of the location determination device.

2. The method of claim 1 wherein determining a likelihood of obstruction includes determining one of a mean, a maximum or minimum, a median, a gaussian blur or gaussian distribution of the amount of obstruction for points within the window.

3. The method of claim 1 further comprising varying a size of the window for different locations within the field of view.

4. The method of claim 1 wherein the sensor is a camera and further comprising directing radiation to the camera through a fisheye lens.

5. The method of claim 4 wherein the size of the window is larger at the edges of the field of view through the fisheye lens compared to the center of the field of view.

6. The method of claim 1 further comprising transforming the sensor signals from the field of view of the sensor to a matrix of elevation versus azimuth.

7. The method of claim 1 further comprising determining a standard deviation of the amount of obstruction for locations within the window.

8. The method of claim 7 further comprising using the standard deviation to weight the amount of obstruction.

9. The method of claim 1 wherein the window size is at least 3×3 pixels.

10. The method of claim 1 further comprising:
  determining the amount of obstruction of different objects in an image with a trained machine learning module.

11. The method of claim 10 further comprising varying a size of the window based on a confidence level of the amount of obstruction for each type of obstruction from the trained machine learning module.

12. The method of claim 1 further comprising:
  determining a size of the window based on a combination of at least:
  an error signal from the sensor;
  an error signal from an Inertial Measurement Unit (IMU); and
  an error signal associated with the satellite signal.

13. A method for determining an amount of obstruction of a view of a satellite from a location determination device, comprising:
  receiving a satellite signal;
  extracting a satellite location measurement from the received satellite signal;
  directing radiation through a fisheye lens to a camera;
  receiving an image from the camera;
  determining obstructed areas in a field of view of the camera that are at least partially obstructed;
  transforming the obstructed areas from the field of view of the camera to a matrix of elevation versus azimuth;
  determining an estimated location of the satellite in the field of view of the camera;
  determining a window of locations around the estimated location of the satellite;
  determining a likelihood of obstruction of the satellite signal from an overlap of the obstructed areas and locations in the window, including locations other than the estimated location of the satellite, by determining a mean of the amount of obstruction for points within the window;
  determining a standard deviation of the amount of obstruction for locations within the window;
  using the standard deviation to weight the amount of obstruction; and
  determining an amount of weight to give to the satellite signal in determining a location of the location determination device.

14. A non-transitory computer-readable medium having stored thereon instructions that, when executed by one or more processors, cause the one or more processors to perform operations including:
  receiving a satellite signal;
  extracting a satellite location measurement from the received satellite signal;
  receiving a sensor signal from a sensor;
  determining obstructed areas in a field of view of the sensor that are at least partially obstructed;
  determining an estimated location of the satellite in the field of view of the sensor;
  determining a window of locations around the estimated location of the satellite;
  determining a likelihood of obstruction of the satellite signal from an overlap of the obstructed areas and locations in the window, including locations other than the estimated location of the satellite; and
  determining an amount of weight to give to the satellite signal in determining a location of a location determination device.

15. The non-transitory computer-readable medium of claim 14 wherein determining a likelihood of obstruction includes determining a mean or gaussian distribution of the amount of obstruction for points within the window.

16. The non-transitory computer-readable medium of claim 14 wherein the instructions further include:
  varying the size of the window for different locations within the field of view.

17. The non-transitory computer-readable medium of claim 14 wherein the sensor is a camera and further comprising directing radiation to the camera through a fisheye lens.

18. The non-transitory computer-readable medium of claim 17 wherein the size of the window is larger at the edges of the field of view through the fisheye lens compared to the center of the field of view.

19. The non-transitory computer-readable medium of claim 14 further wherein the instructions further include:
   transforming the sensor signals from the field of view of the sensor to a matrix of elevation versus azimuth.

20. The non-transitory computer-readable medium of claim 14 further wherein the instructions further include:
   determining a standard deviation of the amount of obstruction for locations within the window.

\* \* \* \* \*